Jan. 5, 1926.  
W. E. KELLY  
TIRE  
Filed Feb. 26, 1923  
1,568,559
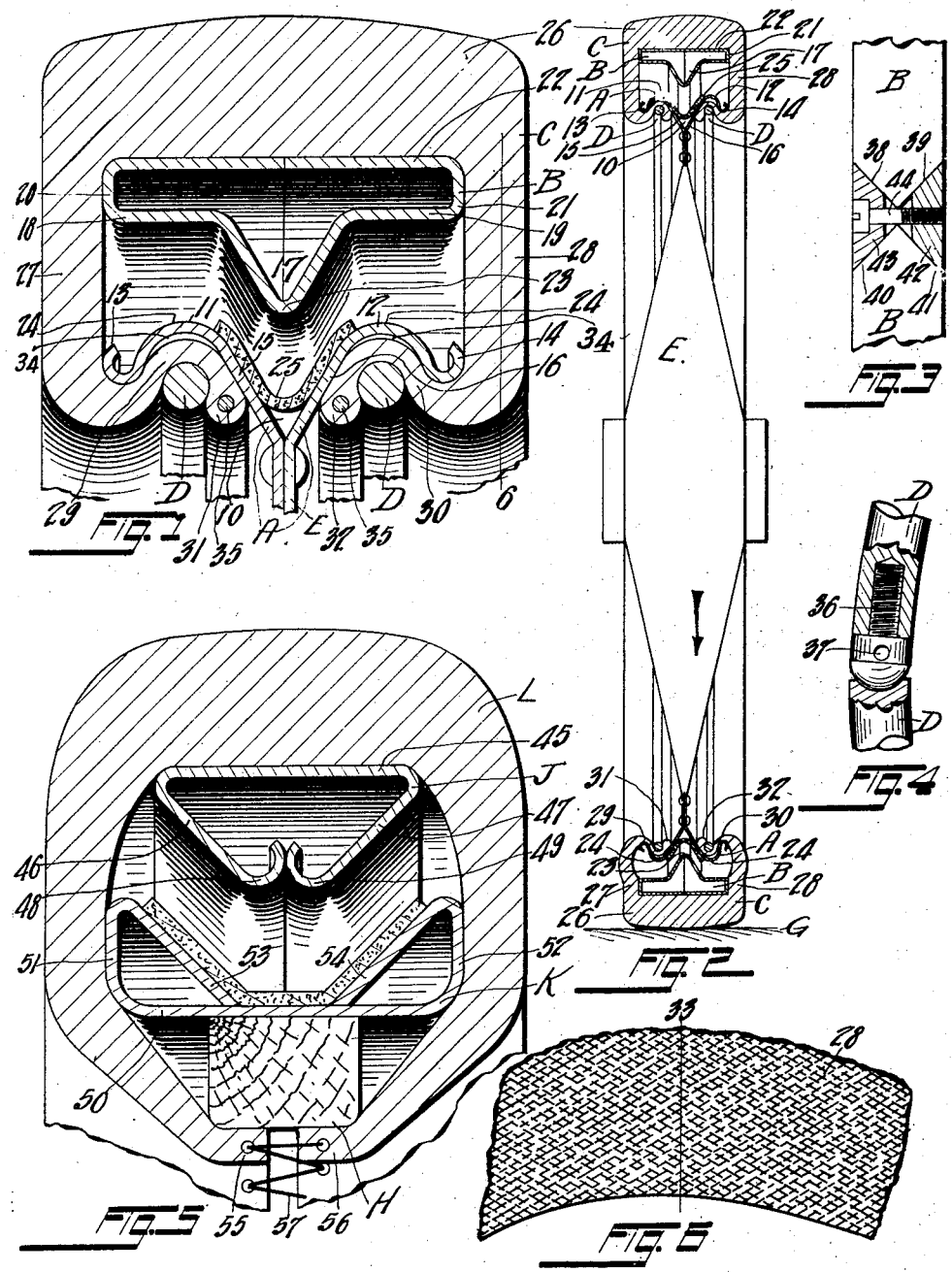

Patented Jan. 5, 1926.

1,568,559

UNITED STATES PATENT OFFICE.

WILLIAM E. KELLY, OF CLEVELAND, OHIO.

TIRE.

Application filed February 26, 1923. Serial No. 621,482.

*To all whom it may concern:*

Be it known that I, WILLIAM E. KELLY, a citizen of the United States, and a resident of Cleveland, county of Cuyahoga, and State of Ohio, have invented a new and useful Tire, of which the following is a specification.

My invention relates, generally, to tires, such as are used on vehicles for instance, and particularly to tires which have a cushioning or resilient effect on the wheel to which they are attached.

The main object of my invention is a tire which has a cushioning or resilient effect upon a wheel without inflation by air or other gas and which eliminates the inconveniences of punctures and the like. Other objects will appear during the description of the tire structures shown in the drawing.

I attain my objects by the structures shown in the accompanying drawing which shows two examples of the application of my invention, but such showing is by no means the only embodiment of my invention.

In this drawing, Fig. 1 is a cross section of a tire; Fig. 2 is a section of a complete tire as related to a wheel and illustrates the actions of the elements of their relations to each other when the tire is in action; Fig. 3 is a plan view, partly in section, showing an expansion means for the outer rim; Fig. 4 is a sectional view of a portion of an expansible ring to lock the casing in position; Fig. 5 is a cross section of a tire having an inner and an outer rim of a form different than that shown in Fig. 1 and having a laced casing; Fig. 6 is a sectional view of a portion of the sides of a casing, indicated by the line 6 in Fig. 1 and showing one manner of fabric or core structure. Similar reference characters refer to similar parts throughout the views.

Cushion or resilient tires, as heretofore made, depend upon inflation or compression spring means for cushioning or resiliency. The tire of the present invention depends upon tension spring means generally and upon the stretch of the material of the sides of the casing particularly for cushioning or resiliency.

One structure, embodying the features of the present invention, is shown in cross section in Fig. 1 and in diametrical section in Fig. 2 and consists, principally, of the inner rim A, the outer rim B, the casing C, and the lock-rings D.

The inner rim A is, in this instance, formed directly on the outer circumference of the disc-wheel E and has the V-shaped groove 10, the arcuate channels 11 and 12, and the flanges 13 and 14. The groove 10 being formed by the angularly bent portions 15 and 16 of the halves of the disc-wheel and the channels and flanges are formed on the respective halves as shown.

The outer rim B is formed of sheet metal with the V-shaped inwardly projecting flange 17 substantially of the same general contour as the V-shaped groove 10, and with the substantially cylindrical portions 18 and 19 adjacent the flange 17, and with the substantially vertical walls 20 and 21, and with the substantially cylindrical outer wall 22.

As at present preferred, the inside diameter of the outer rim, at the point 23 of the flange 17, is a little larger than the outside diameter of the inner rim over the points 24 so that the outer rim can readily be placed over the inner rim when assembling the tire.

The liner 25, made of fabric or rubber or combination thereof or other suitable material, is placed into the groove 10 for the purpose appearing presently, although such liner could also be secured to the flange 17 with equally good results.

The casing C is composed of the tread portion 26, the walls 27 and 28, the lock portions 29 and 30, and the retainer portions 31 and 32.

The portion 26 may be made of any form and of any material suitable for tread purposes, such as rubber compositions, and may be provided with non-skid means if desired.

The walls 27 and 28 form one of the important features of the present structure due to the resiliency required therein for the purpose appearing presently.

As at present preferred, the walls 27 and 28 are made of flexible rubber which is preferably, traversed obliquely, in relation to the radial axis of a wheel as indicated by the line 33 in Fig. 6, by cords or fabric as seen in Fig. 6. The walls 27 and 28 must be constructed so that the material thereof can not only be stretched but also so that it will return to its original state or form after the stretching thereof ceases. Or in other words, the walls 27 and 28 must be of a quality substantially like a spring or like the material of a rubber band. The material of the walls 27 and 28 may, conveniently, converge into the material of the tread portion 26; and the cords or fabric thereof may also extend into or traverse the portion 26.

The lock portions 29 and 30 conform, in contour, to the arcuate channels 11 and 12 and to the flanges 13 and 14 respectively. It is preferred, however, that they do not bottom entirely but leave the spaces 34 as seen in Fig 1 so that a better lock is effected. These portions 29 and 30 must be made sufficiently strong to prevent breakage thereof when the tire is under load.

The retainer portions 31 and 32 are enlarged, in relation to the lock portions, and may, conveniently, be provided with the reenforcing ring 35.

The lock-rings D engage the lock portions 29 and 30 to hold the casing to the under side of the inner rim, and are split radially where they may, conveniently, be provided with an expansion means such as is shown in Fig. 4 and consists of the screw 36 threaded into one end of the ring D and provided with a round-ended head countersunk into the other end of the ring D. Manipulation of the screw 36, by means of the holes 37 therein, expands or contracts the diameter of the ring so that the same can force the respective lock portion of the casing into its channel or permit the same to be readily removed therefrom.

It may also be found quite convenient to introduce an expansion means into the outer rim B so that the same may be expanded when necessary or desirable.

An expansion means suitable for such purpose is shown in Fig. 3 where the rim B is cut radially by the bevel faces 38, 39, 40, and 41, and the wedges 42 and 43 (shown sectionally) are interposed into the spaces produced by these cuts. The screw 44 is threaded into the wedge 42 and the head thereof is countersunk into the wedge 43.

Such a tire, when assembled on a disc-wheel, is shown in Fig. 2 and the operation thereof is as follows: When the tire is first assembled on the wheel, the outer rim B is substantially concentric with the inner rim A, and the sides are free from distortion and no portion thereof is under stress in any direction. After the tire rests on the ground G, and the wheel carries a load, this wheel, and consequently the rim A, tends to move downward, but since the casing C is secured to the under side of the inner rim, the wheel can only move downward when the material of the walls 27 and 28 stretches at the top. For this reason these walls are made as previously described so that they can stretch and so that they return to their original shape when the load thereon is released as is occasioned by the wheel while it is revolving. Since these walls 27 and 28 are resilient, no inflation or other means is required to provide a cushioning effect for the wheel.

The proportioning of these walls as to strength, and the composition thereof as to resiliency, must be determined by the load to be carried by the wheel and should, preferably, be so arranged that the flange 17 just touches the liner 25 in the groove 10 when a little more than the normal load, which the wheel is to carry, is brought upon the wheel.

While the tire is in action, the lock-rings D firmly hold the lock portions 29 and 30 to the under side of the inner rim; the retainer portions 31 and 32, being thicker than the lock portions, prevent the inner edges of the casing from passing the lock-rings and since they can not be dislodged when locked, due to the flanges 13 and 14, the tire must remain in position as long as the lock-rings are in position.

As seen in Fig. 2, the wheel E is under some load downward as indicated by the arrow thereon and the upper portions of the walls 27 and 28 are now stretched to some extent while the lower portions thereof are collapsed. The lower portion of the tread of the casing rests on the ground G and the outer rim rests on the inside of the tread portion so that the outer portion of the casing, as well as the outer rim, always retain their respective relation to the ground, but the inner rim and the wheel can and do change their position, in relation to the outer rim, due to the resiliency of the walls 27 and 28; or in other words, the wheel is suspended in the tire by the upper part of the walls 27 and 28.

When this tire is in action, and the wheel moves downward therein, the flange 17 on the outer rim engages the groove 10 of the inner rim and prevents sidewise movement of the outer rim, in relation to the inner rim, within the limits provided between the flange and the groove when under any particular load. Likewise, when the tire experiences a side pressure, as when contacting curbstones for instance, this flange and groove arrangement prevents dislodgement of the tire.

With the arrangement and construction of elements as shown and described, the tire has high resiliency as well as considerable side movement when under lighter tire loads which is desirable under such conditions, and this resiliency as well as this side movement diminishes as the load on the tire increases which is also desirable, and this resiliency as well as this side movement ceases when the tire is overloaded, at which time the flange of the outer rim rides in the groove in the inner rim at the lower part of the wheel which is also desirable. In either event, the tire can not be dislodged from the wheel either by overload or by lighter loads or when side pressure is exerted thereon since the flange of the outer rim always engages the groove of the inner rim at the bottom and prevents such dislodgement as long as the lock-rings are in position.

The liner 25 is provided to prevent metal to metal contact and consequent noise when the tire is suddenly forced upward as in a bump for instance.

The sheet metal construction of the rims provides not only a light weight structure but also provides a certain amount of resiliency in these parts themselves so that, when they contact, either straight up and down or sidewise to either side, the tire and the wheel will not experience as serious a shock as would be occasioned by solid metal contact.

The tire so far described is adapted for direct mounting on a disc-wheel which has the inner rim formed directly on the outer circumferences of the two discs of the wheel.

The tire shown in Fig. 5 is adapted for mounting on a wooden wheel H and is composed of the outer rim J, the inner rim K, and the casing L.

The outer rim J is here formed with the substantially cylindrical outer wall 45, and the inwardly and inclinedly bent portions 46 and 47 forming an inwardly extending V-shaped flange and the ends of which are formed into the loops 48 and 49 contacting each other as shown to produce a resilient effect when contacting other portions of this structure.

The inner rim K is here formed with the wall 50 resting on the rim of the wheel H, and with the walls 51 and 52, and with the inwardly and inclinedly bent portions 53 and 54 forming a groove adapted to the V-shaped flange on the outer rim.

The tread and walls of the casing L are constructed and arranged and proportioned similar to the casing C except that the locking means shown in Fig. 1 is replaced by the ends 55 and 56 on the inner edges of the casing which ends are provided with holes for the lacing 57 wherewith these inner ends or edges of the casing are tied to each other under the wheel rim.

The relation of the V-shaped flange to the groove and the purpose thereof, and the sheet metal construction thereof, as well as the operation of the tire and the casing, are similar to that previously described.

Other modifications may be made as to form and arrangement and disposition of elements, as well as to the application thereof.

Therefore, without limiting myself to the precise construction and arrangement and application of elements shown and described,

I claim:—

1. In a resilient tire, the combination of, an outer rim, an inner rim, means between both of said rims for limiting the movement of said outer rim in relation to said inner rim, a casing over both of said rims, the sides of said casing free from distortion when no load is on the tire and said inner rim is in normal relation to said outer rim, and the upper portion of said sides adapted to stretch and the lower portion of said sides adapted to collapse when a load is on the tire and both of said rims are out of normal relation.

2. In a resilient tire, the combination of, an outer rim provided with an inwardly extending V-shaped flange, an inner rim provided with a V-shaped groove adapted to said flange, a casing over both of said rims, said flange adapted to enter said groove to limit and to gradually decrease the sidewise movement of said outer rim in relation to said inner rim as the load on said tire increases, and the sides of said flange adapted to seat themselves upon the sides of said groove when said tire is overloaded.

3. A resilient tire including, an outer rim, an inner rim co-operating with said outer rim, a casing over both of said rims, the sides of said casing normally free from distortion and the upper portion thereof adapted to stretch when a load is carried on said tire, and re-enforcing cords in said sides and disposed inclinedly to the lines of said stretch in the material of the sides to permit said sides to stretch without materially stretching said cords.

4. In a resilient tire, the combination of, an outer rim provided with an inwardly extending V-shaped flange, an inner rim provided with a V-shaped groove adapted to said flange, a casing over both of said rims, the sides of said casing substantially flat and parallel with each other, the material of said sides adapted to stretch to carry the load on said tire, said flange adapted to enter said groove to limit and to gradually decrease the sidewise movement of said outer rim in relation to said inner rim as said load on the tire increases, and the sides of said flange adapted to seat themselves upon the sides of said groove when said tire is overloaded and to limit said stretch of the sides of the tire.

5. In a resilient tire, the combination of, an outer rim provided with an inwardly extending V-shaped flange, an inner rim provided with a V-shaped groove adapted to said flange, a casing over both of said rims, the sides of said casing substantially flat and parallel with each other, the material of said sides adapted to stretch to carry the load on said tire, re-enforcing cords in said sides and so disposed to the lines of said stretch in the material of the sides to permit said sides to stretch without materially stretching said cords, said flange adapted to enter said groove to limit and to gradually decrease the sidewise movement of said outer rim in relation to said inner rim as said load on the tire increases, and the sides of said flange adapted to seat themselves upon the sides of said groove when said tire is overloaded and to limit said stretch of the sides of the tire.

6. A tire comprising, an outer rim composed of an outer wall and two side walls and an inner wall provided with an inwardly extending flange, an inner rim within said outer rim and spaced away therefrom and provided with a groove adapted to said flange and with a lock channel on the under side thereof on each side of said groove, a casing over both of said rims and the inner edges thereof extending into said channels, and a lock-ring over each of said inner edges and adapted to hold the same in their respective channels.

7. A tire comprising, an outer rim composed of an outer wall and two side walls and an inner wall provided with an inwardly extending flange, an inner rim within said outer rim and spaced away therefrom and provided with a groove adapted to said flange and with a lock channel on the under side thereof on each side of said groove, a casing composed of a tread portion disposed over said outer rim and of two side walls extending over the sides of both of said rims and of two lock portions projecting from said walls and each provided with a lock-groove and a retainer portion adjacent said groove, and a lock-ring in each of said grooves and adapted to hold said lock portions of said casing in said lock channels of said inner rim.

8. A tire comprising, an outer rim, an inner rim, a casing over both of said rims and the inner edges thereof extending under the inside of said inner rim, lock-rings adapted to hold said inner edges to said inner rim, and means for circumferentially expanding said lock-rings comprising a screw threaded into one of the ends of each of said lock-rings and the head of said screw counter-sunk into the other of said ends.

9. A tire comprising, an outer rim, an inner rim, a casing over both of said rims and secured inside of said inner rim, and an expanding means for said outer rim comprising a pair of wedges actuated by a screw and bearing against wedge faces provided on said outer rim.

10. A tire comprising, an outer rim, an inner rim, a casing over both of said rims and the inner edges thereof extending under the inside of said inner rim, lock-rings adapted to hold said inner edges to said inner rim, means for circumferentially expanding said lock-rings comprising a screw threaded into one of the ends of each of said lock-rings and the head of said screw countersunk into the other of said ends, and means for circumferentially expanding said outer rim comprising a pair of wedges actuated by a screw and bearing against wedge faces provided on said outer rim.

11. In combination, a disc-wheel composed of two discs and the outer edge of each flanged to form a groove when both of said discs are assembled, and a tire having a rim provided with a flange adapted to enter said groove and gradually decrease the sidewise movement of said tire as the load thereon increases and seat itself in said groove when said tire is overloaded.

12. In combination, a disc-wheel composed of two discs and the outer edge of each flanged to form a groove when both of said discs are assembled and each of these flanged edges provided with means to engage a tire, and a tire having a rim provided with a flange adapted to enter said groove and limit the sidewise movement of said tire in relation to said wheel when a load is applied thereto and seat itself in said groove when said tire is overloaded, and said tire adapted to engage said tire engaging means on said wheel.

13. In combination, a disc-wheel composed of two discs and the outer edge of each flanged to form a groove when both of said discs are assembled and each of these flanged edges provided with means to engage a tire, and a tire having a rim provided with a flange adapted to engage said groove and a casing over said rim and over said edges of said disc-wheel and the inner edges of this casing provided with means for engaging said means to engage a tire.

14. In combination, a disc-wheel composed of two discs and the outer edge of each flanged to form a groove when both of said discs are assembled and each of these flanged edges provided with a lock channel, and a tire having a rim provided with a flange adapted to engage said groove and a casing over said rim and over said edges of said disc-wheel and the inner edges of this casing adapted to engage said lock channels, and a lock-ring over each of said inner edges of said casing to force the same into the respective of said lock channels.

15. In combination, a disc-wheel composed of two discs and the outer edge of each flanged to form a groove when both discs are assembled and each of these flanged edges provided with a lock channel adjacent said groove and with a retainer flange adjacent said lock channel, a tire comprising an outer rim radially spaced away from said flanged edges of said wheel and provided with an inwardly extending flange adapted to said groove in said wheel, a casing over said outer rim and said flanged edges and the sides thereof adapted to stretch and to return to orginal form and the inner edges thereof extending over said lock channels, and lockrings adapted to force said inner edges of said casing into said lock channels.

16. In combination, a disc-wheel composed of two discs and the outer edge of each flanged angularly to form a V-shaped groove when both of said discs are assembled, and a tire having a rim provided with a V-shaped flange adapted to enter said V-shaped groove and gradually decrease the sidewise movement of said tire as the load thereon increases and seat itself in said groove when said tire is overloaded.

17. As an article of manufacture, a tire having a casing, an outer rim, and an inner rim cooperating with said outer rim and both of said rims within said casing, said outer rim formed of sheet metal of uniform cross section with a V-shaped flange having the pointed periphery thereof extending inwardly of said tire and closed to prevent collapse thereof, said inner rim formed of sheet metal of uniform cross section with a V-shaped groove having its converging sides meeting inwardly of said tire and adapted to said flange.

18. As an article of manufacture, a tire adapted to carry a tire load by stretching the sides thereof and comprising a tread portion, two sides normally free from distortion but adapted to stretch under load, and re-enforcing cords in the material of said sides and disposed at an angle to the lines of said stretch thereof to permit said sides to stretch without materially stretching said cords.

WM. E. KELLY.